H. M. BURGESS.
NUT LOCK.
APPLICATION FILED OCT. 5, 1912.
1,060,064.
Patented Apr. 29, 1913.
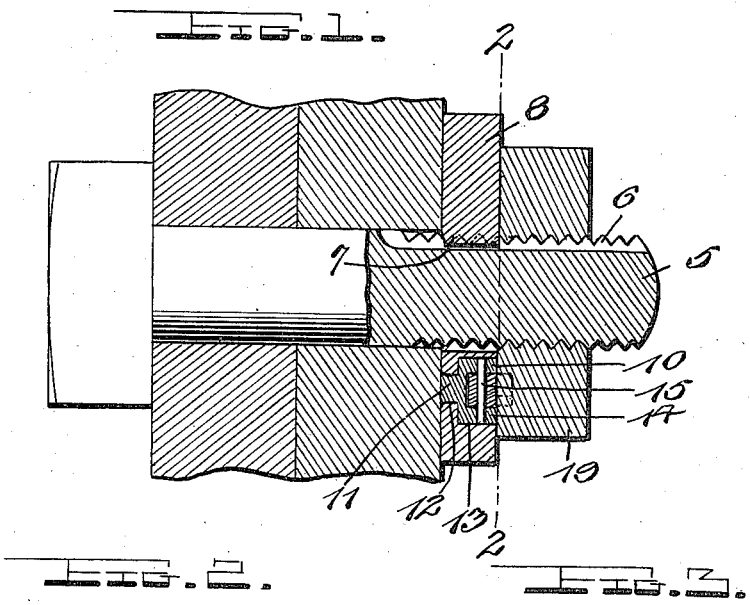
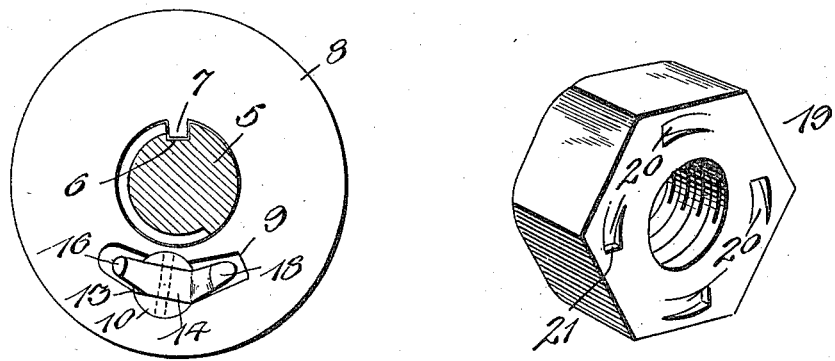
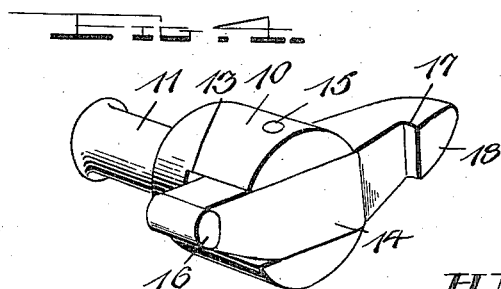
Inventor
H. M. Burgess,
Witnesses
By Watson E. Coleman
Attorney

UNITED STATES PATENT OFFICE.

HENRY M. BURGESS, OF WELLINGTON, ALABAMA.

NUT-LOCK.

1,060,064.  Specification of Letters Patent.  Patented Apr. 29, 1913.

Application filed October 5, 1912. Serial No. 724,139.

*To all whom it may concern:*

Be it known that I, HENRY M. BURGESS, a citizen of the United States, residing at Wellington, in the county of Calhoun and State of Alabama, have invented certain new and useful Improvements in Nut-Locks, of which the following is a specification, reference being had to the accompanying drawings.

This invention relates to improvements in nut locks and has for its primary object to provide a simple, efficient and durable device of this character wherein the locking means is completely hidden from view and protected against accidental injury or the effect of the elements.

Another and more specific object of the invention resides in the provision of a washer keyed upon the bolt and carrying the locking element, and a nut threaded upon the bolt provided with means upon one face to coöperate with said locking element, whereby the nut is securely and permanently locked in position against the face of the washer.

A still further object of the invention resides in the provision of a nut lock wherein the use of springs is entirely eliminated, thus rendering the device highly durable and obviating all liability of release of the nut.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a section through the nut and washer showing the same arranged upon a bolt and the nut locked thereon; Fig. 2 is a section taken on the line 2—2 of Fig. 1; Fig. 3 is a detail perspective view of the nut; and Fig. 4 is a similar view of the locking dog, and the stud in which said dog is mounted.

Referring in detail to the drawing, 5 designates a bolt consisting of a threaded shank provided with the usual head on one end. The shank of the bolt has formed therein a longitudinal key way 6 to receive the key 7 formed upon the washer plate 8 which is loosely engaged upon the threaded shank of the bolt for longitudinal movement, said key holding the washer against rotative movement on the bolt.

The washer 8 is adapted to be moved inwardly upon the bolt into close engagement with the face of the object through which the bolt is disposed and the outer face of this washer plate is provided with a recess 9. A stud 10 is provided with an enlarged head centrally located in said recess, the outer end of said head being flush with the face of the washer plate 8. The stud 10 also includes a reduced cylindrical shank 11 which is adapted for disposal through an opening 12 formed in the washer plate 8 and communicating with the recess 9. The end of this shank 11 is adapted to be clenched or swaged upon the face of the washer plate.

The enlarged head of the stud is provided with a longitudinal recess 13 to receive the locking dog 14. This dog is loosely mounted upon a pin 15 and has limited pivotal movement in the stud 10. The ends of the dog 14 project from opposite sides of the stud 10 and one extremity thereof is formed with a lug 16 which is adapted to project outwardly from the recess 9 beyond the face of the washer 8. The other extremity of the locking dog is provided with a shoulder 17 having a beveled face 18, the purpose of which will be hereinafter more fully explained.

The nut indicated at 19 is provided with a threaded bore for engagement with the threads of the bolt shank. Recesses 20 are cut into one face of said nut, said recesses being preferably arranged at diametrically opposite points as shown. The base walls of these recesses gradually slope or incline inwardly to produce the shoulders 21 at one end of the recesses.

In the use of the device, the washer plate 8 is first arranged upon the bolt in engagement with the object through which the bolt extends and the nut 19 is then threaded upon the bolt shank, with the recessed face thereof opposed to the face of the washer in which the pivoted locking dog 14 is mounted. As the nut is threaded against the face of the washer, the face of the nut engaging with the beveled face of the shoulder 17 forces this end of the locking dog inwardly into the recess 9 and projects the lug 16 on the other end of the dog outwardly beyond the face of the washer plate and into one of the recesses 20 of the nut.

This lug engaging the shoulder 21 at the end of the recess in the nut will effectually prevent any reverse turning movement of the nut upon the bolt so that the nut is prevented from working off of the end of the bolt.

From the foregoing, it will be seen that I have devised a very simple, efficient and positive lock for nuts whereby the same are securely and permanently locked upon the bolt. As the locking dog 14 is completely covered or hidden from view by the nut 19, liability of accidental breakage of said locking dog which would release the nut, is prevented.

The device consists of comparatively few elements which are of simple form and it will therefore be obvious that the invention can be manufactured at small cost. Owing to the elimination of all springs or similar breakable holding elements, a maximum of durability in devices of this character is obtained.

While I have shown and described the preferred construction and arrangement of the various elements, it will be understood that the invention is susceptible of considerable modification within the scope of the claims without departing from the essential features or sacrificing any of the advantages thereof.

Having thus described the invention, what is claimed is:

1. The combination of a bolt, a washer keyed thereon, a locking dog pivotally mounted intermediate of its ends in the face of said washer, and a nut threaded upon the bolt provided with a recess in its face, said nut being adapted to engage one end of the locking dog as it is threaded into engagement with the face of the washer and force the other end of the dog outwardly into the recess in the face of the nut.

2. The combination of a bolt, a washer keyed thereon, and provided with a recess in one of its faces, a dog pivotally mounted intermediate of its ends in said recess, and a nut threaded upon said bolt and provided with a recess in its face, said dog having a shoulder formed on one end to be engaged by the face of the nut as the same is threaded into engagement with the washer, whereby the other end of said dog is forced outwardly into the recess in said nut.

3. The combination of a bolt, a washer keyed thereon and provided with a recess in its face, a stud mounted in the washer and centrally located in said recess, a locking dog pivotally mounted intermediate of its ends in said stud and provided with a lug on one end, a nut threaded upon said bolt having a recess in its face, said nut being adapted to engage one end of the locking dog as it is threaded into engagement with the washer and force the lug on the other end of said dog outwardly into engagement with the recess of the nut.

4. The combination of a bolt, a washer keyed thereon having a recess in one face and an opening communicating with the recess, a stud having an enlarged head centrally located in said recess and provided with a shank fixed in the opening in said washer, a locking dog pivoted intermediate of its ends in the head of said stud, one end of said dog being provided with an outwardly projecting lug and the other end having a shoulder thereon, and a nut threaded upon said bolt and having a recess in its face and adapted to engage the shouldered end of the dog as the nut is threaded into engagement with the face of the washer and force the lug on the other end of said dog outwardly and into the recess in said nut.

In testimony whereof I hereunto affix my signature in the presence of two witnesses.

HENRY M. BURGESS.

Witnesses:
W. E. KELLY,
L. F. KIRBY.

---

Copies of this patent may be obtained for five cents each, by addressing the "Commissioner of Patents, Washington, D. C."